United States Patent [19]

Margolis

[11] Patent Number: 4,948,607

[45] Date of Patent: Aug. 14, 1990

[54] METHOD FOR ELIMINATING FAT FROM A GROUND MEAT PRODUCT

[76] Inventor: Geoffrey Margolis, 12229 Falkirk La., Los Angeles, Calif. 90049

[21] Appl. No.: 406,768

[22] Filed: Sep. 12, 1989

Related U.S. Application Data

[63] Continuation-in-part of Ser. No. 224,449, Jul. 25, 1988, abandoned.

[51] Int. Cl.$^5$ .................... A23L 1/314; A23L 1/317
[52] U.S. Cl. .................... 426/281; 426/417; 426/523; 426/646
[58] Field of Search ............... 426/281, 641, 646, 478, 426/480, 523, 417

[56] References Cited

U.S. PATENT DOCUMENTS

| | | |
|---|---|---|
| 1,656,662 | 1/1928 | Carter et al. |
| 2,070,850 | 2/1937 | Trabold |
| 2,075,407 | 3/1937 | Schwartzman |
| 3,344,731 | 10/1967 | Trees .................... 99/257 |
| 3,457,853 | 1/1970 | Morley .................... 99/349 |
| 3,603,240 | 9/1971 | McCarthy .................... 99/251 |
| 3,663,233 | 5/1972 | Keszler |
| 3,675,567 | 7/1972 | Rejsa et al. .................... 99/257 |
| 3,682,655 | 8/1972 | Touba .................... 426/523 |
| 3,739,712 | 6/1973 | Duning .................... 99/349 |
| 3,754,469 | 8/1973 | Gasior .................... 99/532 |
| 3,762,307 | 10/1973 | Badovinac .................... 99/345 |
| 3,802,635 | 4/1974 | Drischel .................... 241/282 |
| 3,863,556 | 2/1975 | Townsend .................... 99/487 |
| 3,906,115 | 9/1975 | Jeppson .................... 426/243 |
| 3,922,357 | 11/1975 | Townsend .................... 426/281 |
| 3,949,659 | 4/1976 | Hunt .................... 99/348 |
| 3,965,807 | 6/1976 | Baker .................... 99/375 |
| 4,005,226 | 1/1977 | Dykes et al. .................... 426/281 |
| 4,072,092 | 2/1978 | Kohli .................... 99/389 |
| 4,119,022 | 10/1978 | Dykes et al. .................... 99/532 |
| 4,142,000 | 2/1979 | Townsend .................... 426/281 |
| 4,178,660 | 12/1979 | Olney et al. .................... 17/42.1 |
| 4,213,380 | 7/1980 | Kahn .................... 99/349 |
| 4,254,151 | 3/1981 | Townsend .................... 426/231 |
| 4,287,218 | 9/1981 | Rich .................... 426/272 |
| 4,292,889 | 10/1981 | Townsend .................... 99/533 |
| 4,299,851 | 11/1981 | Lowe .................... 426/132 |
| 4,315,950 | 2/1982 | Reed .................... 426/509 |
| 4,345,514 | 8/1982 | Morley .................... 99/349 |
| 4,487,119 | 12/1984 | Townsend .................... 99/487 |
| 4,523,520 | 6/1985 | Hofmann .................... 99/352 |
| 4,556,809 | 1/1986 | Strandine et al. |
| 4,601,237 | 7/1986 | Harter et al. .................... 99/349 |
| 4,622,892 | 11/1986 | Corominas .................... 99/533 |
| 4,667,589 | 3/1987 | Bishop .................... 99/386 |
| 4,715,357 | 12/1987 | Sherman et al. .................... 126/39 |
| 4,746,522 | 5/1988 | Wofford .................... 426/243 |

FOREIGN PATENT DOCUMENTS 41467 3/1985 Japan .................... 426/281

*Primary Examiner*—Arthur L. Corbin
*Attorney, Agent, or Firm*—Spensley Horn Jubas & Lubitz

[57] ABSTRACT

A method and apparatus for eliminating fat from a formed ground meat product while maintaining desireable texture and other eating qualities, comprising the steps of placing the product on a support member configured to promote the flow of fat away from the product; bringing the product to a temperature at which a substantial proportion of the fat contained in the meat is liquified; and compessing the product against the support member only after a portion of the fat contained in the meat is liquified, by applying a pressure which repeatedly traverses the product in a plane parallel to the support member for a period and at a pressure level sufficient to exude a substantial portion of the liquified fat from the product. During at least part of the time when pressure is applied, a non-fat liquid is supplied to the top surface of the product.

20 Claims, 5 Drawing Sheets

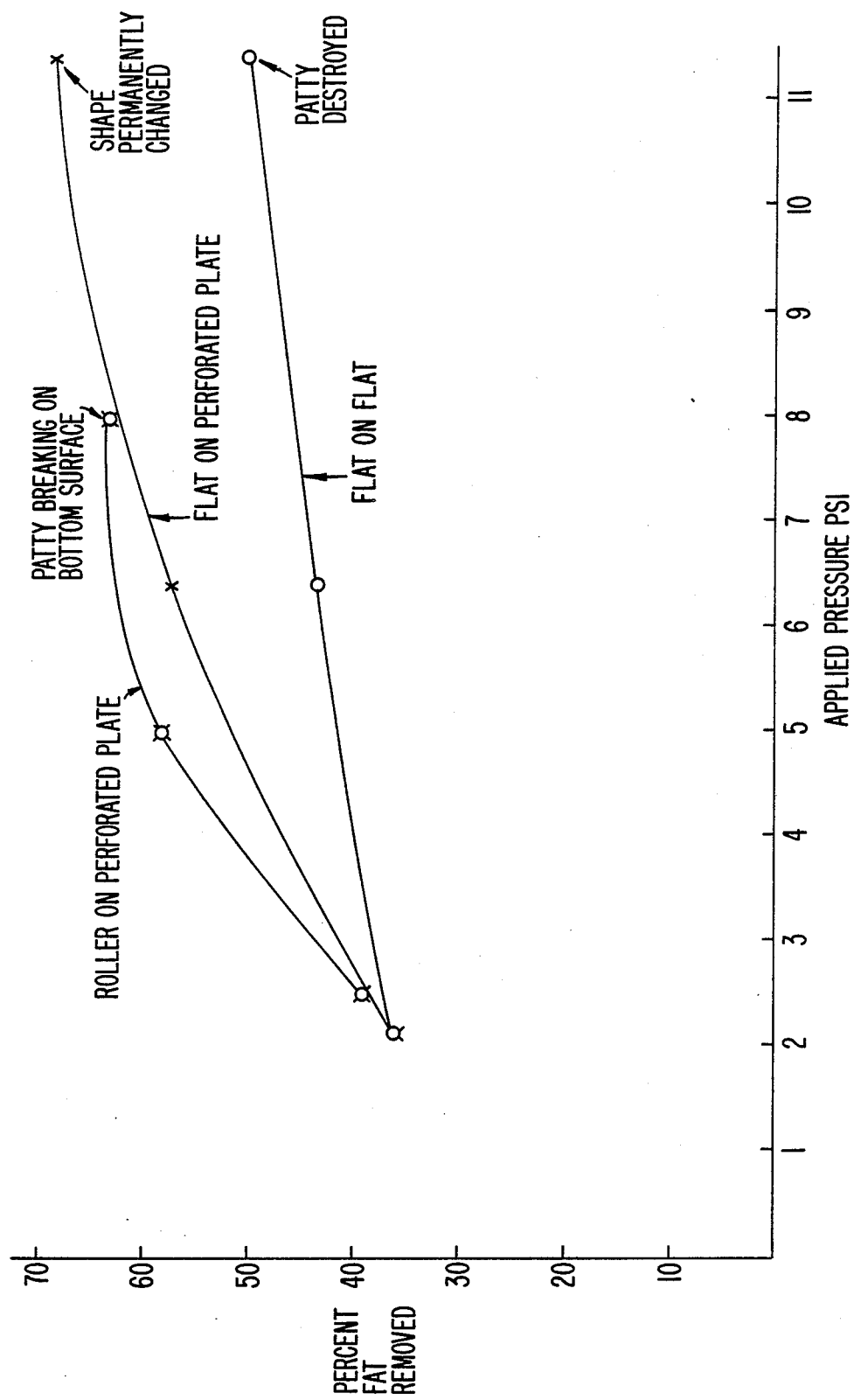
FIG. 4. FAT REMOVAL RATES FOR COOKED HAMBURGERS PLACED ON DIFFERENT SUPPORT SURFACES

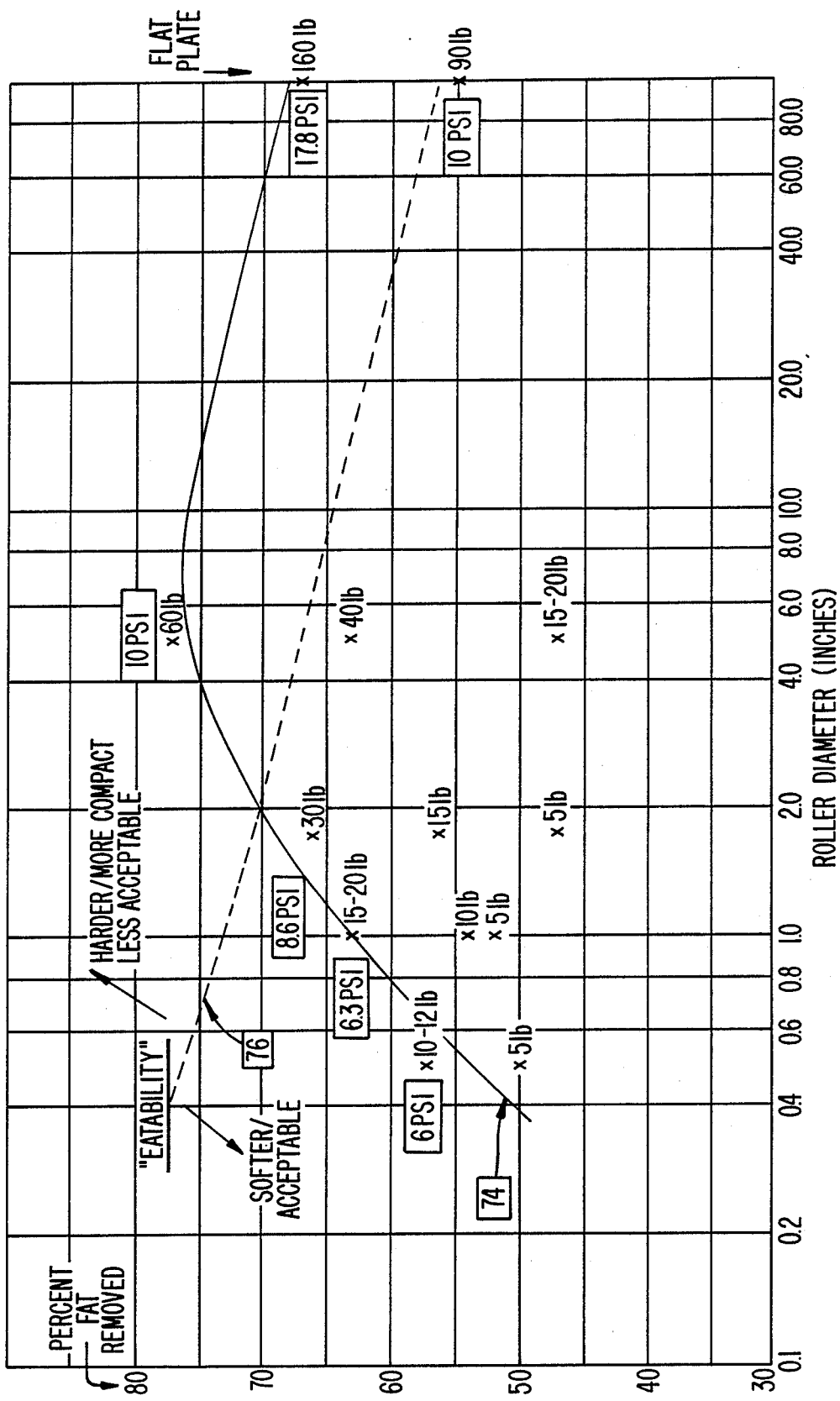

METHOD FOR ELIMINATING FAT FROM A GROUND MEAT PRODUCT

CROSS-REFERENCE TO RELATED APPLICATION

This is a continuation-in-part of application Ser. No. 07/224,449, filed July 25, 1988, now abandoned in favor of application Ser. No. pending 07/430,088, filed Oct. 3, 1989.

BACKGROUND OF THE INVENTION

The present invention relates to the preparation of formed ground meat products, particularly to effect fat removal while maintaining the products' structure and eating qualities.

My copending application, Ser. No. 07/224,449, filed July 25, 1988, now abandoned entitled FAT REMOVAL FROM MEAT PRODUCTS describes a method and apparatus for effecting fat removal from such products by establishing controlled pressure and heating conditions under which the products' structure and eating qualities are simultaneously maintained. As set forth in my co-pending application, herein incorporated by reference, that invention broadly relates to the field of treating meat products, and more particularly, to a methodology which provides for the removal of fat from the meat product, while maintaining the inherent pleasing texture of the meat and without adverse impacting on such product's structural integrity. While that invention, as well as the present invention, can be used with a wide variety of meat products, both have particular applicability in connection with processing hamburger patties.

Processing of hamburger patties is of key concern because that food is extremely popular. People like the taste and texture of hamburgers and the convenience of such a product. However, present literature has associated heart disease with high blood cholesterol levels. Indeed, people with high elevated blood cholesterol levels have been found to be at a higher risk of developing heart disease than people who have relatively low blood cholesterol levels. It has been shown that one factor contributing to high blood cholesterol levels can be a high dietary intake of saturated fats. The American Heart Association (the AHA) has recommended that in order to reduce the risk of heart disease, individuals should reduce their daily dietary intake of fats and cholesterol. Specifically, the AHA has recommended (1) that individuals receive only 30% of their daily caloric intake from fat with only 10% of that amount being derived from saturated fat, and (2) that dietary cholesterol intake be kept below 300 milligrams per day. Unfortunately, hamburgers sold at many fast food restaurants have a high fat and cholesterol content.

While the prior art is aware of methods and related apparatuses for treating meat products to remove fat, (see e.g. U.S. Pat. No. 3,949,659), such methods and apparatuses suffer from a number of shortcomings. In particular, many prior art methods for removing fat are not useful or applicable to a product such as a hamburger or other structured, patty-like meat product, because the methods employed would lead to a meat product consisting of small pieces with a "chunk-like" texture or one having the tough texture of leather (i.e., jerky). Neither of these is structurally equivalent to a hamburger. Further, such products also obviously differ significantly from a hamburger in terms of processability and consumer acceptability.

As set forth in my co-pending application Ser. No. 07/224,449, one of the goals was to reduce fat content yet maintain the shape, appearance, texture and flavor of the product. That goal was achieved by a process for treating a preformed meat product comprising the steps of (1) heating a preformed meat product to a temperature which is sufficiently high to liquify a portion of the fat contained in the patty, (2) applying a specified amount of pressure to the meat product sufficient to cause a substantial portion of the liquified fat contained within the meat product to be exuded therefrom with minimal shape and textural and flavor changes, and (3) removing the fat so exuded from the immediate vicinity of the meat product. That application also discusses a method for enhancing the juiciness and flavor of the meat product by injecting a liquid flavoring solution into the patty.

While the method and apparatus described in my copending application yields a cooked meat product having a low fat content and good eating qualities, it is desirable to achieve further improvements in these areas and to implement the method with an apparatus which is straight forward in its construction and easy to operate.

SUMMARY OF THE INVENTION

It is an object of the present invention to improve fat removal while maintaining flavor and structural integrity of a hamburger or similar cooked meat product.

Another object of the invention is to achieve an increased degree of fat removal over prior methods, while easily producing a tender and juicy ground meat product.

A further object of the invention is to automate such treatment.

The above and other objects are achieved, according to this invention. Broadly speaking, the present invention is directed to a method and apparatus for eliminating fat from a formed ground meat product comprising the steps of: bringing the product to a temperature at which a substantial proportion of the fat contained in the meat is liquified; and compressing the product against a support member only after the product has reached the temperature at which a substantial portion of the fat contained in the meat is liquified, by applying a rolling pressure which repeatedly traverses the product in a plane parallel to the support member for a period and at a pressure level sufficient to exude a substantial portion of the liquified fat from the product, but at a pressure level low enough to maintain the product's structure and eating qualities.

According to a preferred embodiment of the present invention, the formed ground meat product, after having been brought to a temperature at which the surface of the meat and structure has been 'solidified' and at which a substantial portion of the fat contained therein is liquified, is subject to a periodic or continuous rolling compressive pressure while a liquid is supplied to the top surface of the treated meat product. It has been discovered that a key effect of the pressure is to cause sufficient distension of the surface of the cooked meat product, so that the added liquid is able to penetrate through the surface of the meat product and migrate to the interior of the produce where it fills interstices left vacant by fat that has already been exuded due to the application of the rolling pressure. Continued applications of pressure displaces the added liquid towards and through the product. As the liquid is forced through, it displaces more liquified fat. As a consequence, improved fat removal rates can be obtained without the need for higher pressure levels. While the amount of fat removal is to some extent dependent upon the amount present in the uncooked meat, it is possible with the process and apparatus of the present invention to reduce the fat content of a typical hamburger (one having 22% by weight fat initially) by at least 60% by weight. Improved eating qualities are also obtained since at these low pressures minimal compaction of the cooked meat patty occurs.

This method represents an improvement over my prior method in that more fat can be removed at lower pressures and without additional compaction. A further improvement is that by adding the liquid during the pressing step, migration of the liquid to the interior of the meat patty maintains the juiciness of the patty. Thus, the reintroduction of liquid back into the body of the meat patty is highly simplified.

While it is believed that this invention would be applied most frequently to ground beef patties, i.e., hamburgers, it can also be beneficially applied to formed products made of other ground meats, including lamb, veal, pork or chicken.

Preferably, application of the compressive pressure is begun essentially immediately after completion of cooking, i.e., (i) when the product is seared to some extent or is at least sufficiently cooked such that it retains a defined patty-like appearance, and (ii) when the product has an internal temperature suitable for serving and the fat is in a substantially liquified state. At that time, the product is transferred, if necessary, to a treatment station equipped with a compression device according to the invention and the device is placed into operation to effect fat removal in a manner to be described in greater detail below. However, the fat removal procedure can be commenced at any time, even during cooking, so long as a temperature has been reached in the product at which a substantial portion of the fat contained in the product is liquified and the structure of the product has been solidified. While not to be bound by any theory, it is believed that the solidification of the product is due to the greater structural integrity associated with meat protein being denatured through cooking. Raw or minimally cooked meat patties, on the other hand, are subject to tearing and breaking apart.

According to a preferred embodiment of the present invention, the rolling compressive pressure is produced by circular movement of cone rollers about an axis perpendicular to the top surface of the product. The rollers, in effect, perform a movement with respect to each elemental region of the product so that each elemental region is subjected to a periodic compressive pressure alternating with intervals during which the elemental region can expand.

The cone rollers are mounted so that a linear generatrix of each roller is parallel to the top surface of the product, from which it follows that the cone axis is inclined to that surface. Each roller is mounted to rotate freely about its axis while being moved along a circular path about a vertical axis located at least approximately at the center of the product.

With this arrangement, each roller can undergo essentially rolling motion relative to the product. Sliding or dragging movement, which could tear the product, is substantially eliminated since each roller is configured and oriented such that its axis intersects the vertical axis of the circular path at, or close to, the plane of the top surface of the meat product being treated.

The desired rolling movement is achieved most simply by mounting each roller to be freely rotatable about its axis. Then, as the rollers are displaced along the circular path, rotation of each roller about its axis is produced by contact of the roller with the formed product.

Because the compressive pressures are applied to the product by a circular movement about an axis at or near the center of the product, any net movement of the product in response to the rolling forces will be circular, rather than translational. In other words, there will be minimal tendency of the product to be displaced from the region beneath the rollers. Thus, a particularly advantageous features of the invention is that no complex holding devices are needed to hold the product in position.

Although the conical roller system is particularly advantageous in this invention, it has been found that to effectuate greater fat removal, two different sized rollers are helpful. It has been discovered that a portion of the cone-shaped roller adjacent the large outer diameter end is more effective in promoting fat removal. It is believed that as the roller diameter in contact with the patty is reduced, the band of direct compression below the roller becomes sufficiently small such that the liquid is mainly squeezed along the direction of roller movement rather than also downwards and through the patty surface. Increased applied pressure may not overcome this reduction in fat removal efficiency since the small diameter end of cone may simply be pressed further into the patty. This can result in destruction of the meat structure.

In order to offset this effect, devices according to the present invention are provided, as noted above, with two diametrically opposed long rollers positioned so that their large diameter ends act primarily on an exterior annulus of the product and two diametrically opposed, equally large diameter but short length rollers angularly equi-spaced between the long rollers and located to act on the central portion of the product. So as to prevent sliding or dragging movement which could tear the product, both sets of rollers are configured and oriented such that their axes intersect the vertical axis of the circular path at, or close to, the plane of the top surface of the meat product being treated.

Preferably, the large diameter end of each short cone roller lies on a circle passing through approximately the midpoint of the length of each long roller.

According to a further feature of the invention, the roller surfaces can be provided with a non-stick coating, such as PTFE, to facilitate cleaning.

In a device according to the present invention, heat lamps can be provided to maintain the rollers, the support surface for the product and the product itself at a temperature suitable to maintain the fat in a liquid state and to maintain the product at serving temperature. Preferably, the product should be maintained at a surface temperature of the order of 140°-165° F. 165° F. The non-fat added liquid should be delivered at a comparable temperature.

BRIEF DESCRIPTION OF THE DRAWINGS

FIG. 4 is a graph illustrating fat removal rates for cooked hamburgers placed on different support surfaces.

FIG. 5 is a graph illustrating fat removal rates for various roller diameters.

DESCRIPTION OF THE PREFERRED EMBODIMENTS

Figure 1:
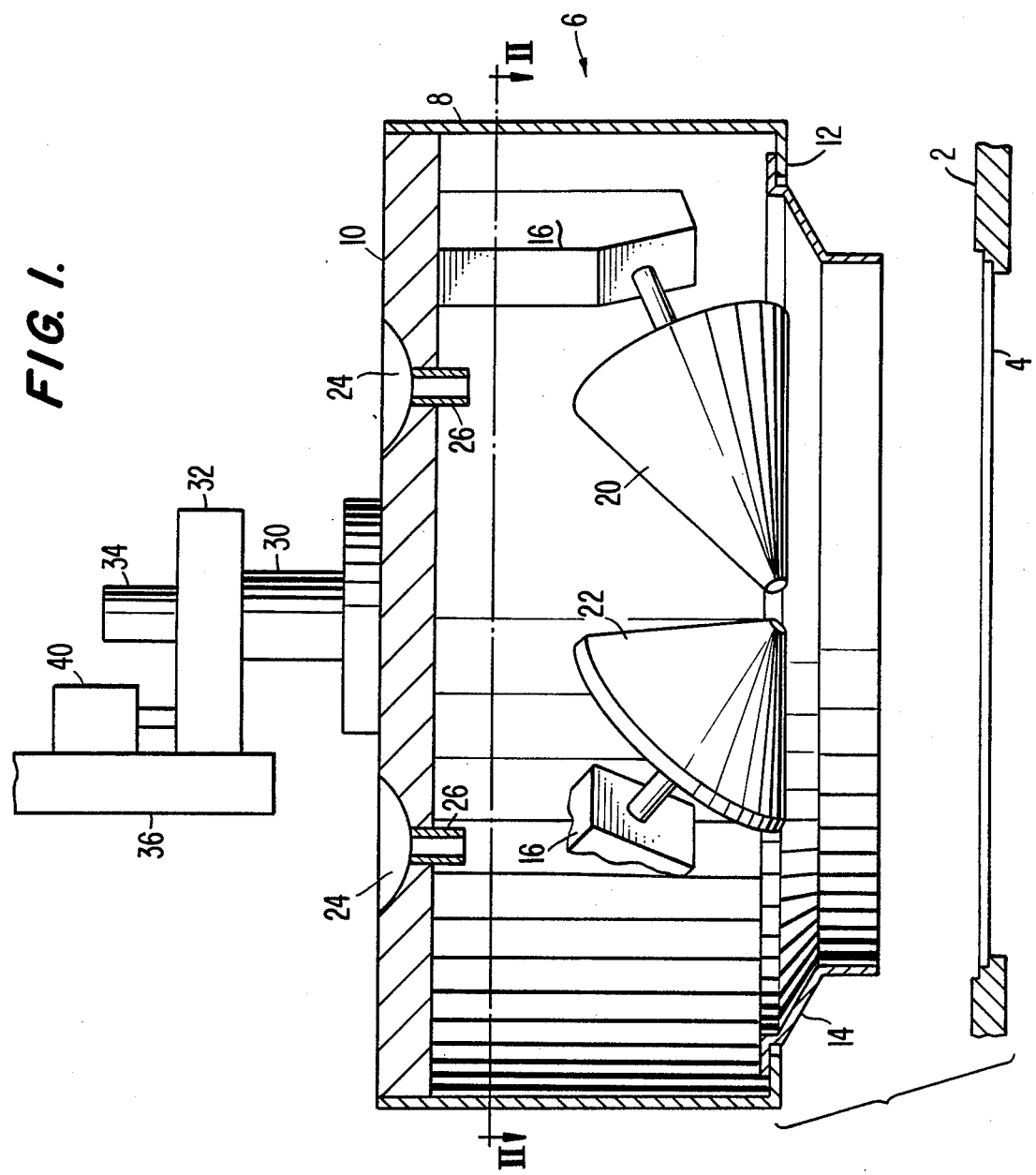
FIG. 1 is a side elevational cross-sectional view of a preferred embodiment of a treatment device according to the invention, taken along line I-I of FIG. 2.
Figure 2:
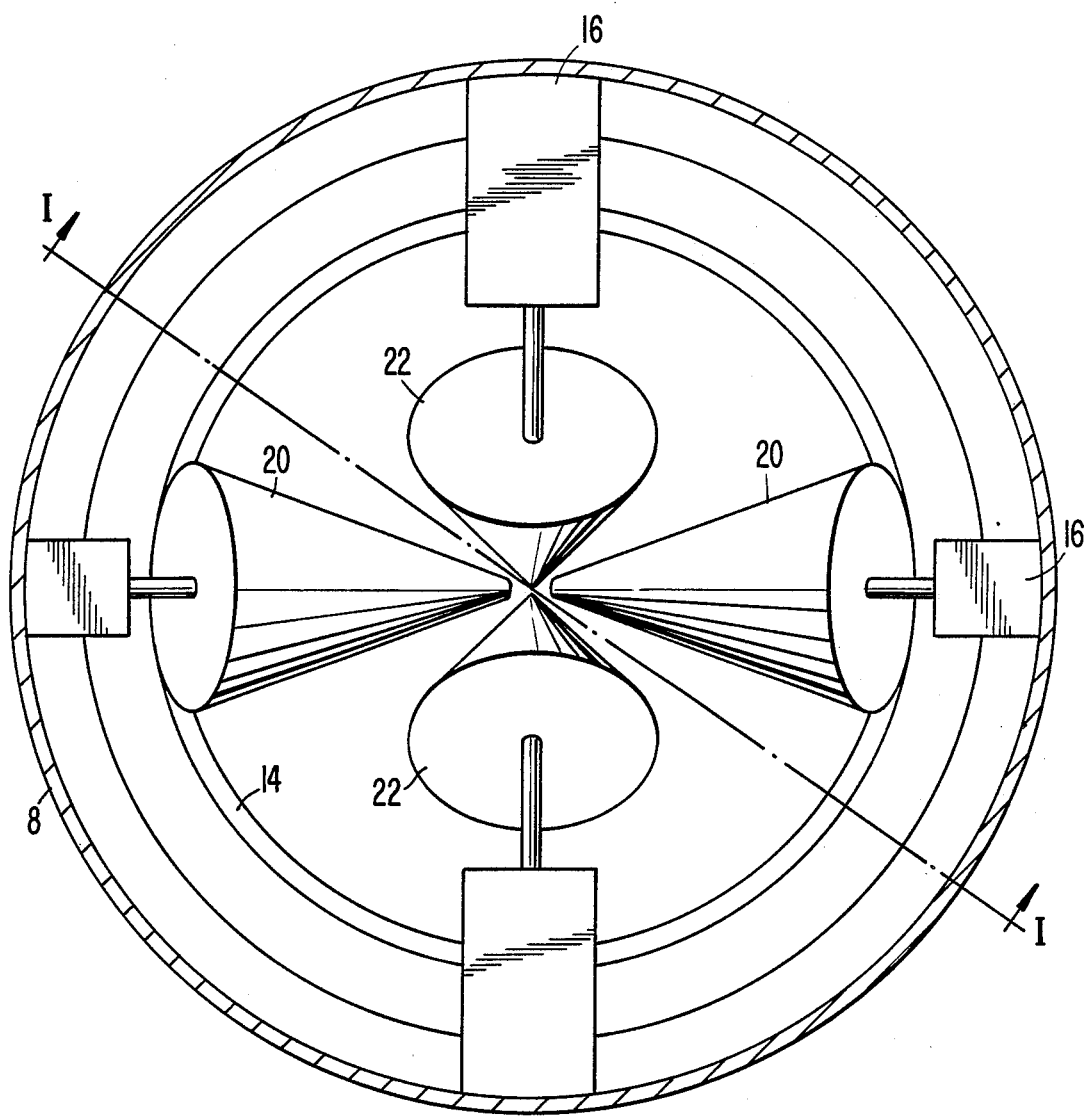
FIG. 2 is a cross-sectional plan view taken along the line II—II of FIG. 1.

FIGS. 1 and 2 illustrate, in a cross-sectional elevational view and a plan view, respectively, a preferred embodiment of a treatment system according to the present invention. This system includes a support member 2 carrying a flat perforated plate 4 on which a formed, ground meat product, such as a hamburger patty, will be placed, preferably immediately after having been cooked. In a typical operation the hamburger is cooked such that the surface is seared to some extent or partially "browned." The internal structure of the hamburger is also cooked to a stage of medium to medium rare, i.e., minimal raw meat portion remaining.

Mounted above member 2 is a pressing device 6 composed of a housing having a circular side wall 8 and a top plate 10. The lower edge of the housing is provided with an inwardly extending rim 12 which supports a retaining ring 14 provided to retain a hamburger patty in position relative to the housing when device 6 is lowered toward support member 2. Retaining ring 14 is loosely supported by rim 12 so that after the lower edge of ring 14 comes to rest upon surface 4, device 6 can continue to be lowered.

Top plate 10 carries four support members 16 each providing a low friction bearing for a shaft carrying a respective cone roller 20 or 22, each roller 20, 22 being mounted so that the axes of all four roller shafts intersect at least approximately at a single point which also contains the vertical axis of symmetry, or center axis, of wall 8. Rollers 20 and 22 are positioned and oriented so that their lowermost edges all lie substantially in a common horizontal plane which contains the above-mentioned single point.

Cover plate 10 of device 6 is provided with a circular trough 24 having associated outlet tubes 26 for the delivery of non-fat liquid, and plate 10 is supported by a shank 30 mounted in a bearing 32 to permit shank 30 and device 6 to be rotated about the vertical center axis of wall 8. Bearing 32 carries a motor 34 coupled to shank 30 in order to produce such rotation.

Bearing 32 is, in turn, supported by a stand 36 in a manner to be vertically movable relative thereto. Coupled between stand 36 and bearing 32 is a force applying device 40, which may be pneumatically actuated, for displacing bearing 32, and the components which it supports, in a vertical direction and applying a selected force thereto.

In the operation of the device illustrated in FIGS. 1 and 2, a cooked, preformed, generally flat hamburger patty is placed on surface 4 and, if necessary, surface 4 is brought into the position illustrated in FIG. 1 below device 6. This may be accomplished, for example, by mounting support member 2 for horizontal movement from a loading or cooking station to the location below device 6. Motor 34 is placed into operation to rotate device 6 and liquid is slowly added to trough 24 as unit 40 is actuated to lower device 6 so as to bring rollers 20 and 22 into contact with the top surface of the hamburger patty and to apply a selected compression force to device 6. Thus, rollers 20 and 22 roll upon the top surface of the hamburger patty applying a compressive pressure while following a circular path about the central axis of wall 8. The bearings in support 16 are low friction devices constructed to permit free rotation of rollers 20 and 22 as a result of their contact with the top surface of the hamburger patty.

During the period of this operation, the hamburger patty is constrained in place on perforated plate 4 by retaining ring 14 which is retained in axial alignment with wall 8.

Figure 3:
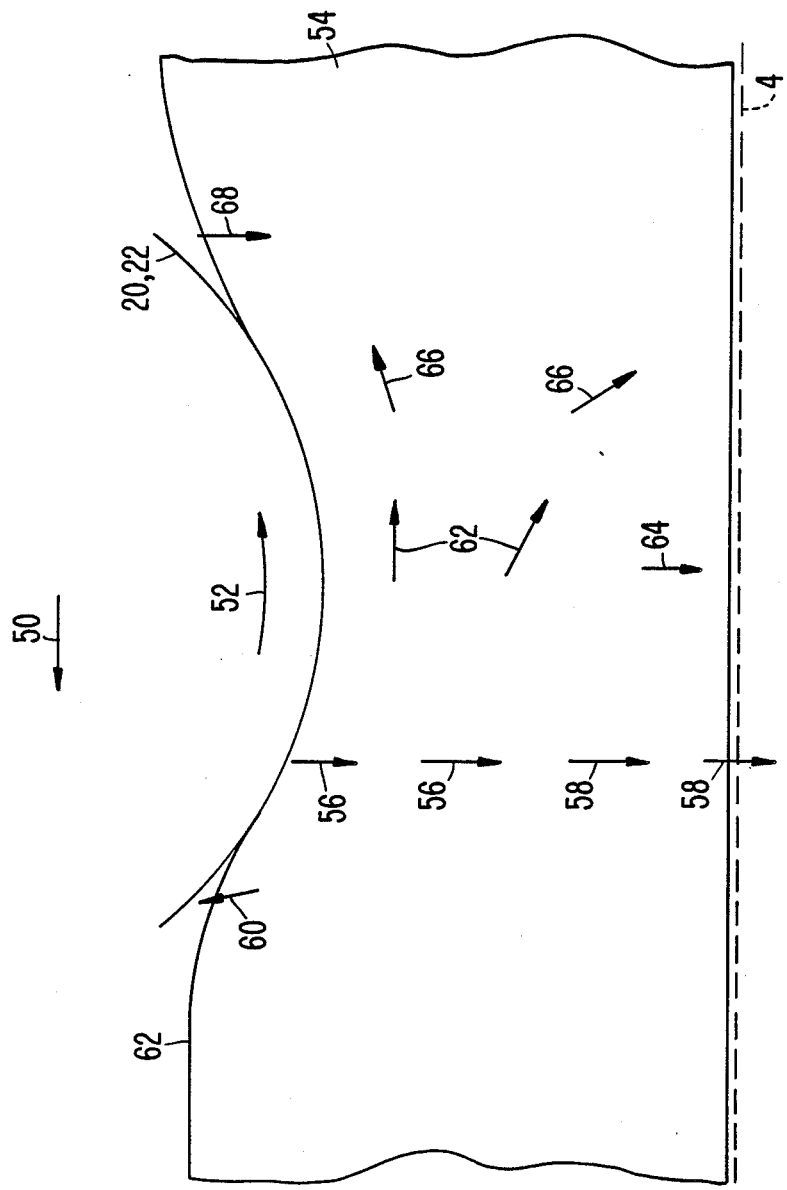
FIG. 3 is a pictorial view illustrating the effect produced by the device of FIGS. 1 and 2.

The action of rollers 20 and 22 on a hamburger patty is depicted in the schematic diagram of FIG. 3.

As roller 20 or 22 advances to the left, as indicated by arrow 50, the roller rotates in a counterclockwise direction, as indicated by arrow 52, and presses downwardly on a hamburger patty 54. Ahead of the advancing compression front, liquid will be forced downwardly between interstices in patty 54, as represented by arrows 56, resulting in the expulsion of liquid, as represented by arrow 58. In addition, some liquid will be forced upwardly, as represented by arrow 60, toward the top surface 62 of patty 54. In the region of maximum compression, some liquid (some of which may be from the patty itself and another portion being sprayed or dripped on from tubes 26) will be forced sideways, as represented by arrows 62, predominately in the direction away from the direction of advance of the compression force because expansion of the patty behind the roller creates a region of reduced pressure. At the same time, some liquid is forced downwardly, as indicated by arrow 64. The liquid which is displaced toward the right will have a displacing effect on liquid in interstices downstream thereof, as indicated by arrows 66. Behind the roller, the top surface 62 of patty 54 is stretched and given a convex curvature, which substantially facilitates the downward entrance and movement of the added liquid through the seared top surface, as indicated by arrow 68. This liquid serves to refill the emptied interstices so that on subsequent rolling it is easier to continue to displace the fat/non-fat liquid mixture in the interstices. Consequently, the liquid supplied to top surface 62 from tubes 26 will significantly enhance removal of fat from patty 54.

Because the added liquid from tubes 26 is controlled as to its constituents, flavorings, spices, etc. can be added to the patty. In the preferred embodiment, the added liquid is substantially fat-free.

Above a minimum applied force, the net effect of the gentle moving pressure produced by rollers 20 and 22 is a significant downward movement of liquid masses. In addition, liquified fat or other meat liquids which initially exude onto top surface 62 from the interior of patty 54 are also subsequently forced downwardly by the action of rollers 20 and 22 and the expansion movements of patty 54.

According to a principal aspect of the invention, the rotating compression forces are applied to the product in a manner to achieve optimum fat removal without damaging the product, as by tearing it. It has been found that achievement of this combination of results is affected by three main parameters: the rate of rotation of the compression forces; the magnitude of the force; and the maximum diameter of the roller cones.

The rate of rotation should be kept low enough to avoid tearing the product, but high enough to effect substantial fat removal in a reasonable time period. It presently appears that a rate of rotation of 7-12 rpm produces optimum results. At this rate, the compression force application can be limited to a period of the order of 90 seconds. The compression force is particularly selected to maximize fat removal while preventing either permanent compaction (toughening) or tearing of the product.

The compression force level is selected, as a function of the area of contact between the rollers and the top surface of the formed product, to cause the product to be resiliently, rather than permanently, compressed at the large diameter end of the conical roller; and to prevent tearing of the patty surface at the sharper diameter end of the conical roller. Under preferred conditions, after a roller has moved past a given elemental region of the product, that region should return approximately to its original thickness so that the product behaves somewhat like a sponge from which entrapped liquid is expelled, primarily downwardly, during compression and into which liquid is absorbed, primarily from the top surface, during subsequent expansion.

The cyclic compression forces also engender frequent movements between adjacent horizontal strata of the product, resulting in improved texture.

If cones having a maximum diameter in excess of about 3 inches are used at a pressure sufficient to remove substantial quantities of fat, there is a tendency for patty compaction to occur. On the other hand, if narrow cones are used having a maximum diameter of less than about 1 inch at similar pressures, tearing of the patty becomes an issue. Further, when using both an acceptable diameter cone and an acceptable applied pressure, it has also been found that less fat is eliminated from the meat in the area below the narrower end of the cone. It is hypothesized that towards the narrow end of the cone the region of direct downward pressure becomes so small that little fat is eliminated from the meat since the majority of the fat below this high pressure region is being displaced sideways.

In order to overcome this reduced fat removal in the center of the patty (towards the apex of the cone where the diameter is reduced), use is made of four cone rollers. Each of these cones has a maximum diameter (i.e., at the large end) of the order of 1 to 2 inches, and preferably about 1.5 inches. Two of the cones are approximately half the length of the other two and the cones are alternatively mounted via support members 16 on the top plate 10 so that they are displaced towards the center of the axis of rotation. The two longer roller cones act with respect to fat removal primarily on an external annulus of the product, and the two shorter roller cones act with respect to fat removal on the central region of the product. In this manner fat can be eliminated approximately equally throughout the entire patty volume. Obviously, a variety of cone configurations and numbers of cones can be used to achieve the above mentioned result provided at least one larger diameter, but shorter length cone is displaced towards the center axis of rotation to effectively act on this region.

As the rolling compression force is applied, non-fat liquid is supplied to the top surface of the product, and that liquid is urged through the top surface to the interior of the product, where it fills interstices left vacant by exuded fat. Intrinsic non-fat liquid in the patty does to some extent serve this purpose. However, the amount of such liquid is frequently not sufficient to aid in the removal of significant amounts of fat and yet maintain juiciness.

The supply of non-fat liquid permits a reduction in the level of compression pressure required to achieve a given percentage of fat removal by filling the interstices left vacant by exuded fat. This pressure reduction substantially aids in maintaining the eating qualities of the product.

In addition to promoting the removal of fat, the delivery of substantially non-fat liquid to the top surface of the product also serves to enhance and reestablish the products juiciness, which would obviously be reduced during the pressing out of fat and non-fat liquid from the meat. This unexpected ability of liquid to penetrate the cooked hamburger surface during the application of pressure therefore serves two important function in this invention—to simultaneously enhance fat removal and to increase the juiciness of the patty.

These benefits of supplying non-fat liquid are optimized if this liquid is supplied for substantially the entire duration of the application of the compression force. However, the juiciness of the product is particularly enhanced if the supply of non-fat liquid to the top surface is continued for a period of time after the compressive force has been substantially decreased. This is achieved because the last added liquid is not forced out, and thus remains in the body of the patty.

According to preferred embodiments of the invention, as non-fat liquid continues to be supplied to the top surface of the meat patty, a force level 8–12 pounds (corresponding to an approximate pressure level of about 4 psi) is applied for the first 60–70 seconds of the quality enhancing treatment and the force level is then reduced to a value of 2–3 pounds (corresponding to an approximate pressure level of 1 psi) during the remainder of the treatment, which serves primarily to allow non-fat liquid to be added to the product without being subsequently squeezed out.

The basis of the present invention can best be understood by reference to the following examples which are intended as illustrations only and are not to be construed so as to limit the invention as set forth in the claims and specifications.

EXAMPLE 1

As set forth in my co-pending application Ser. No. 07/224,449, Example 1 demonstrates the unexpected ability of applied rolling pressure to remove substantial quantities of fat from a cooked preformed hamburger patty while maintaining its inherent shape, structure and eating qualities.

The meat employed in Example 1 is ground beef having a initial fat concentration that is approximately 20% by weight. The initial fat concentration is determined by laboratory analysis based upon weight. The ground beef is formed into circular hamburger patties weighing in the range of from about 108 to about 114 grams. The hamburger patties have a pre-cooked diameter of 11.5 to 12 centimeter. After the ground beef is formed into patties, the patties are frozen in a commercial freezer for at least 12 hours prior to cooking.

The frozen hamburger patties are removed from the freezer and cooked, without thawing, on an electric griddle set at 163° C. During cooking the hamburgers are turned over frequently (at least four times) to ensure even heating throughout the hamburger patty. The temperature of the cooked hamburger patty is measured by a fast-reacting direct-reading electronic thermocouple. The electronic thermocouple is inserted into the hamburger patty to a location approximately halfway between the upper and lower surfaces of the hamburger patty. The temperature which registers on the electronic thermocouple is the final cooking temperature set forth in Table 1.

Once the hamburger patty reaches the desired temperature, it is subjected to a pressing step in the following manner. The cooked hamburger is removed from the electric griddle and placed immediately on a flat board which is inclined from the horizontal at an angle of about 12°. A rolling band of pressure is applied to the cooked hamburger patty by rolling a cylindrical drum over the top surface of the hamburger patty. The fat/water mixture exuded from the hamburger patty during the pressing process is collected in a groove around the edge of the board and emptied into a measuring cylinder. In this manner, the total quantity of fat and non-fat The cooking and pressing action does, however, eliminate liquid (both fat and non-fat liquid) from the hamburger as indicated in column 7 of Table 1. For many of the trials (Runs 1 to 7, 11 and 13) the total percent liquid eliminated (column 7, which is the sum of column 5 and 6) from the hamburger by cooking, pressing and evaporation approximates the percent water lost only by evaporation during the cooking of "well done" hamburgers (31.6% by weight for Runs 9 and 10). Thus, the "juiciness" sensation of the processed (by pressing) hamburger, although reduced, can be considered to be still be within the range of general acceptance. Nevertheless, many consumers desire "juicy" hamburgers and it is for this reason that in a preferred embodiment of the invention, liquid is returned to the hamburger during or after processing to re-establish the anticipated juiciness of a regular (not "well done") hamburger.

TABLE 1

| Run No. | % Start Fat | Final Cooking Temp. (°C.) | Avg. Applied Pressure[1] (psi) | Water Removed By Evapt'n During Cook[2] (%) | Liquid Removed During Pressing & Cooking[2] (%) | Total Liquid (water & fat) lost by evap, press & cook[2] (%) | % Fat Removed | ORGANOLEPTIC DESCRIPTION |
|---|---|---|---|---|---|---|---|---|
| 1 | 18.3 | 55 | 2.5 | 23.5 | 14.0 | 37.5 | 39 | Soft, easy to chew |
| 2 | 18.45 | 50 | 2.5 | 16.7 | 15.7 | 32.4 | 42 | Soft, easy to chew |
| 3 | 17.6 | 40 | 6.9 | 4.6 | 14.5 | 24.1 | 39 | Not completely cooked |
| 4 | 17.6 | 47–50 | 6.9 | 13.5 | 22.0 | 35.5 | 65 | Soft, easy to chew |
| 5 | 18.45 | 50 | 6.9 | 12.7 | 21.5 | 34.2 | 60 | Soft, easy to chew |
| 6 | 18.45 | 48–55 | 6.1 | 15.0 | 19.4 | 34.4 | 54 | Soft, easy to chew |
| 7 | 18.3 | 50–55 | 6.9 | 22.9 | 17.0 | 39.9 | 46 | Firmer, easy bite |
| 8 | 17.6 | 55–60 | 6.9 | — | 19.0 | — | 58 | Firmer, easy bite |
| 9 | 17.6 | 70 | 6.9 | 31.6 | 11.0 | 42.6 | 43 | Firmer bite; dry taste |
| 10 | 17.6 | 70–75 | 6.9 | 31.6 | 12.4 | 44.0 | 47 | Firmer bite; dry taste |
| 11 | 20.4 | 50 | 8.9 | 12.6 | 25.0 | 37.6 | 68 | Firmer, easy bite |
| 12 | 20.4 | 55 | 8.9 | 19.0 | 20.0 | 39.0 | 57 | Firmer bite |
| 13 | 20.4 | 55 | 8.9 | 15.4 | 22.7 | 38.1 | 62 | Firmer, easy bite |
| 14 | 18.3 | 50–55 | 10.2 | 22.0 | 20.3 | 42.3 | 57 | Firmer bite, not tough, dry taste |

[1]Mass average applied pressure based on a rolling contact surface 2 cm wide with an after-cooking diameter of 9 cm.
*Not measured
[2]Percent based on starting hamburger weight.

moisture removed from the hamburger patty during the pressure application is determined. The cylindrical drum is rolled across the hamburger patty five times. The quantity of fat rendered during the cooking process is added to the fat eliminated during compression to define the total fat removed during the entire process.

The texture of the resultant cooked, pressed hamburger patty is determined organoleptically.

The above-described experiment was conducted on a number of individual hamburger patties cooked to different temperatures and pressed at different pressures. The results of the experiment are set forth in Table 1 herein. This table is similar to the one in my copending application, but also includes additional information.

As shown in Table 1, it is possible at very low applied rolling pressure to remove substantial quantities of fat from a cooked preformed hamburger patty. This result is particularly unexpected in view of the fact that in prior art processes, much higher pressures had to be used. Further, maintaining the hamburger's inherent shape, structure and eating qualities can be attributed to the unexpected fact that the hamburger behaves somewhat like a "sponge" under the low rolling pressures required for the elimination of substantial quantities of fat from the cooked preformed patty.

EXAMPLE 2

Cooked hamburgers behave somewhat like a "sponge." Their interstices are filled with liquid fat and the meat structure is sufficiently flexible to be able to withstand a low applied pressure without permanent destruction. As a consequence, it is possible to eliminate substantial quantities of fat from the patty and still maintain its inherent shape, structure and eatability provided prior to pressure application, the heated hamburger is placed on a surface designed to both support it and facilitate the immediate separation of any fat exuded during the pressure application.

In order to demonstrate this discovery, frozen ¼ lb. hamburger patties (4¾ inch diameter and ⅜ inch thickness) having a starting fat content of about 22% by weight were broiled on an electric griddle (set at 350° F.) under identical conditions (% cooking loss—water and fat—27–28%). These hamburgers were then processed either on a solid flat surface or on a perforated plate. The hamburgers were pressed at various applied pressures according to the following techniques:

(1) When a solid flat surface was used, hamburgers were placed directly on this surface which was in turn supported on a scale. The top surface of the hamburger was then covered with a second solid flat surface and a force (measured on the scale) was applied to the top surface, thus squeezing the hamburger between these two flat solid surfaces. After the applied force was released and the hamburger removed, the exuded fat quantity left on the lower flat surface was recorded together with the pressed and non-pressed weights of the hamburger and the fat quantity rendered during cooking. Percent fat removed during processing could therefore be estimated. This experiment was repeated at increasing forces until the patty was permanently destroyed. The applied pressure was calculated from the applied force divided by the cooked patty surface area (14 in.²) and the results are shown in FIG. 4 as "Flat on Flat."

(2) The apparatus described in Example 3 was used for the perforated plate experiments with the pressure being applied to the hamburger either by a flat solid surface or a rolling device (1¾ in rolling drum) Percent fat exuded during processing was measured at various applied increasing pressures, until once again the patty structure was permanently modified. Applied pressure when using the flat solid surface was calculated as above. Applied pressures reported for the roller experiments were estimated as the mass average pressure from the pressures applied to different sectors of the circular hamburgers, each having a width equal to the roller circular perimeter in contact with the meat at a particular applied pressure (0.7 inch at 2.5 psi; 0.8 inch at 5 psi; 1.2 inch at 8 psi). Results are presented in FIG. 4 as "Flat On Perforated Plate" and "Roller on Perforated Plate."

As can be seen from FIG. 4 at similar applied pressures, substantially more (plus 13% at 3.0 psi; plus 43% at 7 psi; plus 37% at 11 psi) fat is separated from a patty placed on a perforated plate as compared to a flat solid surface. The hamburger behaves somewhat like a "sponge" since if the pressure is released while the patty is still in contact with exuded fat (as in "Flat on Flat") a substantial amount of fat is sucked back into the patty resulting in a lower percent fat removal. As shown in FIG. 4, when a perforated plate is used not only can a quality patty be produced, but because the exuded fat is directed away from the patty before it can be drawn back into the structure, substantially more fat can be eliminated.

EXAMPLE 3

Since rolling pressure is particularly effective for fat removal under gentle conditions, a series of experiments were undertaken using different roller diameters and applied pressures to determine conditions under which maximum fat elimination could be achieved while maintaining the hamburger's shape, structure and eating quality.

Standard frozen ¼ lb. hamburger patties (4¾ in. diameter and ⅜ in. thickness) having a starting fat content of about 22% by weight were cut into a square shape (so that the rolling pressure could be applied across a constant width cooked hamburger) and broiled on an electric griddle (set at 350° F.) under standard, repeatable and identical conditions (% cooking loss [water and fat] 27-28%). Each hamburger, immediately after having been cooked, was placed on a horizontal perforated plate mounted in a support structure and a funnel was placed beneath the perforated plate to direct liquid from the hamburger into a measuring cylinder. The entire structure was placed on a scale so that the force applied to the rollers could be measured. Various roller diameters were employed, percentage of fat removal was measured, and the texture of each resulting hamburger was tested in a subjective and objective manner. Fat removed values reported were based on the fat collected in the measuring cylinder, the weight difference of the patty before and after pressing and the fat rendered during cooking.

FIG. 5 is a diagram which depicts the relationship between percentage of fat removed and roller diameter (including a flat plate—a very large diameter roller) at various applied compression forces. With a particular sized roller, several different experiments were repeated at increasing applied forces, until a maximum in fat removal was achieved. This maximum in fat removal occurred either when the hamburger structure started to be destroyed by cutting or tearing (as occurred for rollers of diameters less than about 5 inches due to the penetration of the roller into the hamburger) or when little further fat removal could be achieved without permanently distorting the hamburger structure. Line 74 on FIG. 5 is a locus connecting approximately points of maximum fat removal for various rollers when maximum pressure for the particular diameter roller was being applied. FIG. 5 additionally includes a number of data points representing different compressive force values which were tested and all the data shown on FIG. 5 are summarized in Table 2.

TABLE 2

| | Operating Conditions | | | | Organoleptic Evaluation | |
|---|---|---|---|---|---|---|
| Run No | Roller Diameter | Force Applied To Roller or Plate | Applied Pressure[1] | Percent Fat Removed | Taste Comments | Percent Compaction[2] |
| 1 | ½" | 5 lb | | 50 | Softish | 9 |
| 2 | ½" | 10-12 lb | 6 psi | 57 | Soft/easy bite; breaking up on bottom | 13 |
| 3 | 1" | 5 lb | | 52 | Soft/easy bite | 13 |
| 4 | 1" | 10 lb | | 54 | Soft/easy bite | 9 |
| 5 | 1" | 15-20 lb | 6.3 psi | 63 | Soft/easy bite; breaking up on bottom | 12 |
| 6 | 1¾" | 5 lb | | 47 | Softish | 9 |
| 7 | 1¾" | 15 lb | | 56 | soft/sl. firm | 13 |
| 8 | 1¾" | 30 lb | 8.6 psi | 66 | Harder/more compact. Breaking up on bottom | 26 |
| 9 | 5" | 15-20 lb | | 47 | Soft/easy bite | 13 |
| 10 | 5" | 40 lb | | 63 | Sl. soft/firm some compaction | 26 |

TABLE 2-continued

| | | Operating Conditions | | | Organoleptic Evaluation | |
|---|---|---|---|---|---|---|
| Run No | Roller Diameter | Force Applied To Roller or Plate | Applied Pressure[1] | Percent Fat Removed | Taste Comments | Percent Compaction[2] |
| 11 | 5" | 60 lb | 10 psi | 77 | Firm/compact; breaking up on bottom | 31 |
| 12 | Flat | 90 lb | 10 psi | 55 | Firmer/compact | 30 |
| 13 | Flat | 160 lb | 17.8 psi | 64 | Hard/compact | 39 |

[1] For various rollers limiting applied pressure estimates based on roller penetrating 3/16" into cooked hamburger. For flat pressure application, pressure calculated as applied force/cooked hamburger surface area. (9 in²)

[2] Percent compaction defined as $100 \times \frac{[\text{Initial (non processed)} - \text{Final (after processing)}] \text{ Hamburger thickness}}{\text{Initial Hamburger thickness}}$ Whereas the experiments were performed by varying the force applied to a given roller, it is clear that the relevant parameter that affects fat removal rates is the intensity of the applied force or the force per contact area between the roller and the hamburger. Since the contact area for rollers increases with increased applied force, the pressure at rupture was estimated by assuming that rupture of the hamburger surface occurred when the roller penetrated at least 3/16" into the hamburger (representing 50% of the cooked non-processed hamburger thickness).

Broken line 76 depicts a boundary region above which a noticeable toughening and compaction of a hamburger patty is produced. The boundary represented by line 76 is based on a number of factors including organoleptic evaluation and percent compaction of the hamburger after pressing. From FIG. 5, it can be seen that fat removal levels of the order of 60-65 weight percent can be achieved, without tearing or toughening a hamburger patty with rollers having a maximum diameter in the range of 1-2 inches and compression pressures in the range of 6 to 9 lb/in². Further, additional fat can be removed, to about 70 weight percent, while still achieving many of the eatability factors.

Furthermore, it can be seen that as the roller diameter drops below 1 inch, a decrease in fat removal is observed. It is for this reason that at least two sizes of cones are used in the present invention. The large diameter shorter cones offset the fat removal inefficiencies of the small diameter region of the longer cones, so that the cooked patty can be essential equally processed across its entire surface at acceptable low pressures.

EXAMPLE 4

Several experiments were carried to demonstrate the influence of supplying a non-fat liquid to the top surface of hamburger patties simultaneously with the application of rolling compressive pressures. A device having a form as shown in FIGS. 1 and 2 was employed. Hamburgers as described above were broiled under standard conditions and each hamburger was then placed on a horizontal perforated plate as described above, and liquid eliminated from the hamburger during the application of compressive forces was collected in a measuring cylinder. In one procedure, non-fat liquid was supplied to the top surface of a hamburger patty, while in a second procedure, no liquid was added. In each case, the compression force was brought to a fixed value of 10 lbs. (equivalent to a compressive pressure of about 3.7 psi) selected to produce a high level of fat removal and was maintained at that value for a period of 70-80 percent of the total treatment time. Then, the force was reduced to approximately one-third of its initial value during the remaining 20-30 percent of the force removal time, the purpose of this reduction being to permit non-fat liquid (when used) being introduced into the hamburger to be retained.

The result of these experiments are shown in Table 3. Several unique features of the invention are demonstrated in these results. First in Run 1, even though the applied pressure is only approximately 3.7 psi, the addition of non-fat liquid to the hamburger during pressure application produces significant fat removal (67 wt. %). An applied pressure of 6 to 9 psi would be required to eliminate the same percent fat when no liquid is added. (See FIG. 5). Thus, there is substantially less compaction. Second, even though substantial quantities of fat are removed (when non-fat liquid is added), the weight of the cooked meat remains essentially unchanged indicating that the non-fat liquid has substantially replaced the fat liquid lost during pressing. Consequently the hamburger maintains its "juiciness." This is in contrast to Run 2 where because the liquid pressed out is not replaced, the weight of the meat after pressing is lower than the starting cooked weight, and the hamburger has a dryish taste.

TABLE 3

| Run No | Liquid Addition | Wt. of Fat Pressed Out | Total % Fat Removed | Cooked Wt. of Meat Before Processing | Wt. of Meat After Processing | Comments |
|---|---|---|---|---|---|---|
| 1 | Yes | 12.5 gms | 67% | 80 gms | 78 gms | Soft/juicy |
| 2 | No | 6.5 gms | 46% | 79 gms | 68 gms | Soft/easy bite dryish tasting |

While the description above refers to particular embodiments of the present invention, it will be understood that many modifications may be made without departing from the spirit thereof. Typically, the present invention causes at least about 33% by weight of the fat originally present to be exuded. The exact amount of fat removed is of course dependant upon the amount initially present in the meat and the natural variability of meat quality. As set forth above, however, the present invention can remove over 60% by weight of the fat originally present in a hamburger having an initial fat content of about 22 weight percent. Thus, removal of at least 50% of the fat initially present can readily be achieved by the present invention. Yet other modifications are also within the scope of the present invention. For example, while perforated plate 4 is used as the support for the hamburger, other support surfaces are within the scope of the invention. Further, still while perforated plate 4 is generally flat, other means can be used to direct the exuded fat away from the meat including inclined surfaces and the like. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for eliminating fat from a formed, generally flat cooked ground meat product, while maintaining the structural integrity and texture of such product, comprising the steps of:
   (a) bringing the product to a temperature at which a portion of the fat contained in the meat is liquified;
   (b) compressing the product, while the fat remains liquified, by applying a rolling pressure which repeatedly traverses the product in a plane parallel to the product for a period and at a pressure level sufficient to exude at least 33 percent by weight of the fat from the product while maintaining the shape, structure and eating qualities; and
   (c) removing the liquified fat as it is exuded from the patty.

2. A method as defined in claim 1 further comprising the steps of introducing a substantially non-fat liquid into the product during at least a part of the compressing step (b).

3. A method as defined in claim 2 wherein the product is a hamburger patty having a top and bottom surface, and said step of introducing is carried out by supplying the non-fat liquid to the top of the hamburger.

4. A method as defined in claim 3 wherein the non-fat liquid is supplied in the form of a stream of droplets.

5. A method as defined in claim 2 wherein said step of introducing is carried out by supplying a quantity of non-fat liquid sufficient to cause a substantial portion of the fat initially contained in the product to be replaced by the non-fat liquid.

6. A method as defined in claim 2 wherein said step (b) of compressing is carried out by causing the rolling pressure to travel on a circular path across the product.

7. A method as defined in claim 6 wherein at least about 50 percent by weight of the fat initially present in the product is removed.

8. A method as defined in claim 6 wherein the product has a center and the circular path has an axis located at least approximately in the vicinity of the center of the product.

9. A method as defined in claim 1 wherein said step (b) of compressing is carried out by causing the rolling pressure to travel on a circular path across the product.

10. A method as defined in claim 9 wherein the product has a center and the circular path has an axis located at least approximately in the vicinity of the center of the product.

11. A method as defined in claim 1 wherein the product is compressed in step (b) by placing the product on a support surface which facilitates the removal of fat away from the product.

12. A method for eliminating fat from a hamburger patty, while maintaining the structural integrity and texture of the hamburger, comprising the steps of:
   (a) heating the hamburger patty to a temperature at which a portion of the fat contained in the hamburger is liquified;
   (b) applying pressure to the hamburger only after a portion of the fat contained in the hamburger has been liquified and while the fat remains liquified, the pressure being sufficient to cause a substantial portion of the fat initially contained in the hamburger to be exuded therefrom, but low enough to retain the structural integrity and texture of the hamburger;
   (c) introducing a heated, substantially non-fat liquid into the hamburger during at least a portion of the pressing step (b); and
   (d) removing the liquified fat and added liquid as they are exuded.

13. A method as defined in claim 12 wherein the pressing step (b) is a rolling pressure caused by a series of rollers which repeatedly traverse the hamburger in a parallel plane and on a circular path across the hamburger.

14. A method as defined in claim 13, wherein the rollers have a cone-like configuration.

15. A method as defined in claim 13, where the substantially non-fat liquid has a temperature of about 140° F., and further wherein the hamburger is maintained at a temperature of about 140° F.

16. A method as defined in claims 12 or 13 wherein at least about 50% by weight of the fat initially present in the hamburger is removed.

17. A method as defined in claim 12 wherein sufficient liquid is urged into the hamburger by the series of rollers such that a substantial portion of the fat in the hamburger is replaced with the liquid.

18. A method as defined in claims 13 or 17 wherein the pressure in step (b) is applied for a selected period of time and is reduced toward the end of the period while additional liquid is added such that the last added amount of liquid is urged into the hamburger but is retained therein.

19. A method for eliminating fat from a hamburger patty, while maintaining the structural integrity and texture of the hamburger, comprising the steps of:
   (a) heating the hamburger patty to a temperature at which a portion of the fat contained in the hamburger is liquified;
   (b) applying pressure to the hamburger only after a portion of the fat contained in the hamburger has teen liquified and while the fat remains liquified, the pressure being sufficient to cause at least about 50% by weight of the fat initially contained in the hamburger to be exuded therefrom, but low enough to retain the structural integrity and texture of the hamburger, said pressure being applied to the hamburger while the hamburger is on a support surface configured to facilitate removal of fat and liquid therefrom;
   (c) introducing a heated, substantially non-fat liquid into the hamburger during at least a portion of the pressing step (b); and (d) removing the liquified fat and added liquid as they exude out of the hamburger.

20. A method as defined in claim 19 wherein the pressure in step (b) is applied for a selected period of time and is reduced toward the end of the period while additional liquid is added such that the last added amount of liquid is urged into the hamburger but is retained therein.

* * * * *